United States Patent
Aday, Jr. et al.

[15] 3,663,097
[45] May 16, 1972

[54] RESILIENT MOUNTING STRUCTURE FOR MOVING AT LEAST TWO OPTICAL ELEMENTS IN PRECISE OPTICAL ALIGNMENT

[72] Inventors: Roy W. Aday, Jr., La Habra; Maoyeh Lu, Fullerton, both of Calif.

[73] Assignee: Beckman Instruments, Inc.

[22] Filed: Feb. 27, 1970

[21] Appl. No.: 15,154

[52] U.S. Cl. ...................................................... 350/271
[51] Int. Cl. ......................................................... G02f 1/30
[58] Field of Search .................................................. 350/271

[56] References Cited

UNITED STATES PATENTS

| | | | |
|---|---|---|---|
| 3,242,796 | 3/1966 | Strickley | 350/271 |
| 3,394,977 | 7/1968 | Stiff | 350/271 |
| 3,462,227 | 8/1969 | Tipotsch | 350/271 |

*Primary Examiner*—Ronald L. Wibert
*Assistant Examiner*—Orville B. Chew, II
*Attorney*—P. R. Harder and Robert J. Steinmeyer

[57] ABSTRACT

There is disclosed a flexible mounting structure, rigidly supported at only two locations, for providing opposed precision motion of at least two mounting surfaces oppositely disposed upon the mounting structure in response to a force coupled symmetrically applied to the mounting structure. A pair of resilient connecting members, each having one of the two locations for support, and a pair of rigid mounting rails, each rail having at least one of the mounting surfaces disposed thereon, are connected to form a parallelogram whereby the mounting surfaces are substantially parallel. A rotatable shaft is disposed at right angles and adjacent to the rigid mounting rails. A drive tape is connected between the rotatable shaft and each of the rigid mounting rails in such a manner that as the shaft is rotated, each drive tape wraps around the shaft to provide the symmetrical force couple which moves the mounting rails. A cam follower arm is attached to the rotatable shaft and a cam roller bearing attached to the arm rides on a rotatable cam. Optical elements attached to the mounting surfaces transverse a precision path in accordance with the motion of the mounting rails.

1 Claims, 1 Drawing Figure

PATENTED MAY 16 1972
3,663,097
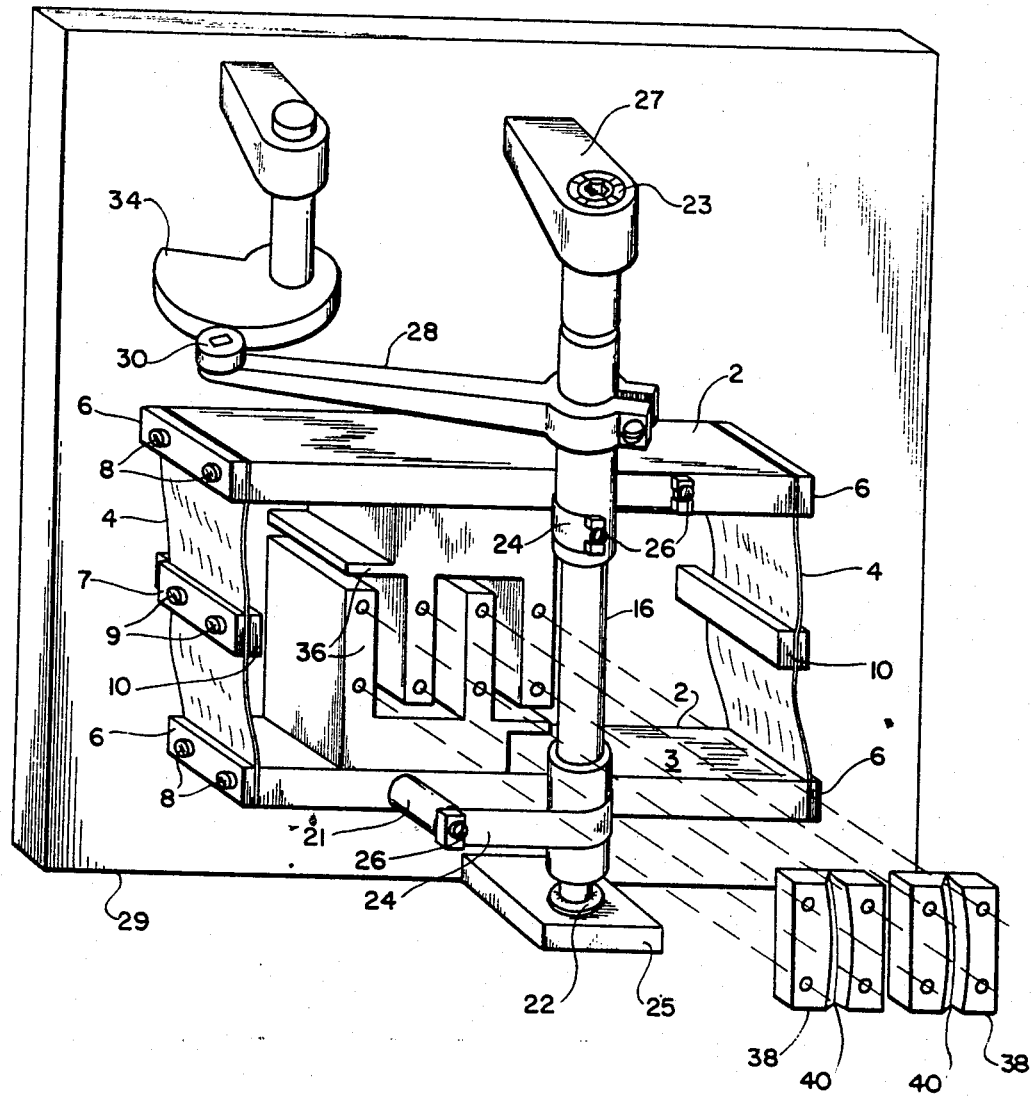
INVENTORS
ROY W. ADAY JR.
MAOYEH LU

RESILIENT MOUNTING STRUCTURE FOR MOVING AT LEAST TWO OPTICAL ELEMENTS IN PRECISE OPTICAL ALIGNMENT

The present invention generally relates to a slit mechanism for radiant energy analyzers and more particularly to a resilient mounting structure for providing precision motion of optical elements mounted thereon wherein coplanar motion and equidistant spacing of the elements is maintained.

In the field of optics, it has been the general practice to employ mechanisms to control the slit width through which a radiant energy beam is passed. Such slits are found useful in monochromators wherein a first slit admits radiant energy from a source and a second slit selects the desired portion of a dispersed radiant energy spectrum. Since the slits affect the resolving power of the monochromator, the slit mechanism controlling these parameters is extremely critical.

The monochromator finds general application in spectrophotometers, wherein the slit widths are varied in a programmed and continuous manner to provide radiant energy beams having predetermined spectral and intensity characteristics. In these instruments it has been the general practice to provide sliding or rotating surfaces to which the slit members are attached and which are supported by fixed supports and bearing surfaces. Although such mechanisms have served the purpose, they have not proved entirely satisfactory under all conditions of service for the reasons that considerable difficulty has been experienced in overcoming the friction of the bearing surfaces and in obtaining repeatability of the desired motion. Those concerned with the development of slit mechanisms have long recognized the need for repeatable precision motion. In general application, the slit width has been found to be only repeatable down to 0.5 mm width. The present invention fulfills this need by providing repeatability down to 0.05 mm slit width.

In an attempt to overcome the problems of friction surfaces, some instruments have turned to resilient slit mounting mechanisms. Most of these are characterized by having one slit defining edge permanently mounted upon a base member and the other slit defining edge mounted upon a rigid mounting rail connected between two resilient members which are attached to the base member. The problems encountered with this type of mechanism are characterized by the inability to maintain coplanar motion of the slit defining edges or to provide equidistant spacing everywhere along the slit edges as one slit member moves with respect to the other. The problem manifests itself in the inability to obtain the required spatial and spectral beam resolution. This problem is overcome by the present invention.

Most spectrophotometers use a slit mechanism by which the slit edges are driven apart by an applied force which overcomes opposing forces of spring biased members, which members are a part of the slit mechanism. If the mechanical linkage by which the applied force is directed to the slit mechanism should fail, the slit defining edges can strike together under the restoring force of the spring biased members with such force that they are irreparably damaged. The present invention overcomes this hazard by driving the slits closed instead of open.

The general purpose of this invention is to provide a resilient optical mounting structure which embraces all the advantages of similarly employed optical slit mechanisms and possesses none of the aforedescribed disadvantages. To attain this, the present invention contemplates a unique arrangement of a pair of rigid and a pair of resilient members to form a structure rigidly supported at only two locations whereby coplanar and equidistant motion of optical elements attached thereto is obtained.

Accordingly, it is the object of the present invention to provide a resilient mounting structure rigidly supported at only two locations and which provides opposed precision motion of two mounting surfaces oppositely disposed thereon in response to a force couple symmetrically applied to the mounting structure.

Another object is to provide coplanar and precision relative motion between optical elements mounted on the resilient structure.

A further object of the invention is the provision of coplanar and equidistant relative motion of slit defining edges used to resolve a radiant energy beam in a spectrophotometer.

Other objects and many of the attendant advantages of this invention will be readily appreciated as the same becomes better understood by reference to the following detailed description when considered in connection with the accompanying drawings in which like reference numerals designate like parts throughout the figures thereof and wherein the annexed drawing illustrates a pictorial view of a preferred embodiment of the present invention.

Referring now to the drawing, a pair of rigid mounting rails 2 having mounting surfaces 3 oppositely disposed thereon are connected by bar keepers 6 and keeper bolts 8 to resilient connecting members 4 in such a manner that the rigid mounting rails and the resilient connecting members form a parallelogram. The central portion of the resilient connecting members are attached to a pair of support posts 10 by a pair of bar keepers 7 and keeper bolts 9. Support posts 10 are mounted upon rigid base member 29. A rotatable shaft 16 is disposed at right angles and adjacent to rigid mounting rails 2. One end of rotatable shaft 16 is supported by bearing 23 in shaft support 27 and the other end is supported by bearing 22 in shaft support 25. Shaft supports 25 and 27 are mounted upon rigid base member 29. A pair of drive tapes 24 are connected between rigid mounting rails 2 and rotatable shaft 16. Drive tape fastener pins 26 fasten one end of the respective drive tapes to one of the rigid mounting rails and the other end to the rotatable shaft. The tapes are mounted in such a manner that as shaft 16 rotates, the rigid mounting rails are driven in opposite directions as each of the tapes winds around shaft 16. In order to offset the thickness of shaft 16, one of the rails is provided with a pedestal 21 to which the corresponding tape drive is connected. Rotatable shaft 16 is connected to cam follower arm 28. Cam roller bearing 30, mounted at the end of cam follower arm 28, rides on cam 34 to rotate shaft 16. Each one of a pair of slit mounts 36 is mounted respectively upon one of the pair of mounting surfaces 3. Slit members 38 are attached to the pair of slit mounts 36. The slit members 38 form slit defining edges 40 by which the radiant energy beam passing therethrough is defined and resolved.

Turning now to the operation of the present invention, the rotation of cam 34 riding upon cam roller bearing 30 moves cam follower arm 28 to rotate shaft 16. This rotation causes tape drives 24 to be taken up on shaft 16 such that the pair of rigid mounting rails 2 are pulled in opposite directions. Resilient connecting members 4 respond such that mounting rails 2 move in a predetermined manner. Slit mounts 36 with slit members 38 having slit defining edges 40 move with the mounting rails to drive the slit defining edges 40 together so as to close the slit to admit less radiant energy and to resolve a particular spectral band. As the shaft 16 is rotated in the opposite direction, the slits are opened as the resilient members return to their unstressed position.

It should be noted that the mounting location of the resilient connecting members 4 upon the support post 10 is not critical. For example, if one end is mounted off center, it should be clear that the relative motion of the rigid mounting rails is still maintained in a parallel manner. This can be observed from the parallelogram nature of the structure created by the pair of rigid mounting rails 2 and the pair of resilient connecting members 4.

To align the optical elements mounted upon the above structure, it has been found in practice that the pair of resilient connecting members 4 and rigid mounting rails 2 can be precisely preassembled with the slit mounts 36 and slit defining edges 40 in the desired relationship before final assembly into a spectrophotometer. This feature of assembly is uniquely different from other methods used in the art and is made possible by the fact that only two mounting locations are required to support the resilient mounting structure, and that because of the parallelogram structure, these mounting locations are not critical. Even if the mounting areas are offset, parallel motion is achieved and maintained between rigid mounting rails 2. Therefore, the slit mounts 36 and slit members 38 with slit defining edges 40 mounted and associated with each of the pair of rigid mounting rails 2, will move in a coplanar and equidistant manner such that each point of the slit defining edges, relative to its matching member, will move in a precise predetermined path thereby enabling the slit opening to be appropriately focused at some distant point and for the slit dimensions to be accurately defined to obtain the proper spectral resolution.

It now should be apparent that the present invention provides a resilient optical mounting structure providing precision motion of two oppositely disposed mounting surfaces employing a minimum of components and which requires only two areas of support. Although particular components and optical elements have been discussed in connection with the specific embodiment of the mounting structure constructed in accordance with the teachings of the present invention, others may be utilized. Furthermore, it will be understood that although an exemplary embodiment of the present invention has been disclosed and discussed, other applications and mechanical arrangements are possible and that the embodiment disclosed may be subjected to various changes, modifications and substitutions without necessarily departing from the invention.

What is claimed is:
1. A spectrophotometer slit-width control mechanism for maintaining at least one pair of slit-defining edges coplanar and equidistant as the slit width is varied in response to a force couple applied to said slit-width control mechanism comprising:
- a pair of rigid mounting members each having a mounting surface thereon;
- a pair of resilient connecting members connected to said pair of rigid mounting members to form a parallelogram, said mounting members forming opposite sides thereof;
- a pair of slit-defining elements, one of said elements being mounted on a first of said mounting members and extending toward the second of said mounting members, the other of said elements being mounted on the second of said mounting members and extending toward the first of said mounting members so as to define a beam path between said pair of slit-defining elements;
- means secured to each of said resilient connecting members at a point midway between said rigid mounting members, the two locations being the only locations of support for the slit-width control mechanism; and
- drive means connected to each of said mounting members along their longitudinal axes for moving said mounting members in opposite directions whereby said pair of slit-defining elements may be opened and closed to vary the beam path width therebetween.

* * * * *